UNITED STATES PATENT OFFICE.

BRUNO RICHARD SEIFERT AND HERMANN HÄHLE, OF RADEBEUL, NEAR DRESDEN, GERMANY, ASSIGNORS TO CHEMISCHE FABRIK VON HEYDEN, AKTIENGESELLSCHAFT, OF RADEBEUL, NEAR DRESDEN, GERMANY.

PROCESS OF MAKING PURE ORTHO- AND PARA-GUAIACOL SULFONIC SALTS.

962,103. Specification of Letters Patent. Patented June 21, 1910.

No Drawing. Application filed August 1, 1905. Serial No. 272,176.

*To all whom it may concern:*

Be it known that we, BRUNO RICHARD SEIFERT and HERMANN HÄHLE, subjects of the King of Saxony, and residents of Radebeul, near Dresden, Kingdom of Saxony, German Empire, have invented a new and useful Process for the Manufacture of Pure Ortho- and Para-Guaiacol Sulfonic Salts, of which the following is a specification.

In the specification of United States Letters Patent 650,218 dated May 23, 1900, as a new article of manufacture a crystallized orthoguaiacolsulfoacid is claimed, which is said to have the form of small white laminæ not melting up to 270° centigrade, to dissolve readily in water, but difficultly in alcohol, to be insoluble in ether, chloroform, benzene and acetone and to give, with ferric chlorid, a blue coloration turning on addition of ammonia to bright yellow. In the corresponding German Letters Patent No. 109789 the inventor says that Tiemann and Koppe, (*Berichte der Deutschen Chemischen Gesellschaft*, 14, page 2019,) have already described the action of concentrated sulfuric acid on guaiacol and that they have obtained two guaiacolsulfonic acids. In the above Letters Patent it is assumed that only one guaiacolsulfonic acid, viz., orthoguaiacolsulfonic acid, is obtained, if the action of sulfuric acid takes place at the distinct temperature of from 70 to 80° centigrade. We have found that this statement of those Letters Patent is erroneous. We have found that by the action of concentrated sulfuric acid on guaiacol at a temperature of from 70 to 80° centigrade and also at lower or higher temperatures a mixture of ortho- and para-guaiacolsulfoacids is obtained, and that disulfo acid is obtained by the action of an excess of sulfuric acid at higher temperatures, *e. g.* at 115° centigrade. The properties which in claim 1 of the U. S. Letters Patent 650,218 are attributed to orthoguaiacolsulfoacid manufactured according to such claim 1, are not the properties of orthoguaiacolsulfo acid, but of guaiacolsulfonic alkali salt, (compare "*Blatt für Patent-, Muster- und Zeichenwesen*", Berlin, 1904, page 239.) We have stated that the preparation brought upon the market under protection of Letters Patent 650,218 (Thiocol) is a mixture of ortho- and para-guaiacolsulfonate of potassium. Our observations could be anticipated as self-evident, guaiacol being a phenol. As a rule, phenols with a free ortho- and para-position, when treated with sulfuric acid, at first give a mixture of ortho- and para-sulfo acids, and at higher temperatures disulfo acid.

We have found that the mixture of ortho- and para-sulfo acid obtained by sulfonizing guaiacol may be separated into ortho- and para-guaiacolsulfonic acids and their salts by transforming said mixture into the basic salts of the alkaline earths or earths. These basic salts of the ortho-acid are easily soluble in water, those of the para-acid are practically insoluble in water. On the contrary, the difference of solubility of the alkali salts is not sufficiently great to permit a complete separation of the ortho and para salts.

Example: It is advisable to sulfonize the guaiacol at a temperature of from 30 to 60° centigrade, from which results a syrupy mixture. This mixture which solidifies readily to a crystalline mass, is liberated from the excess of sulfuric acid and transformed into the neutral salts of lime in the usual manner. Then, to the dark colored solution containing the ortho- and the para-salts

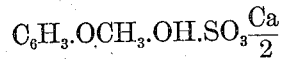

half an equivalent of CaO is added in the form of fine milk of lime while stirring, in order to transform those neutral salts into the basic salts

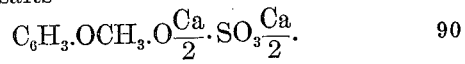

Instead of the milk of lime a mixture of $CaCl_2 + NH_3$ in watery solution may be used. The dark solution now loses color, and colorless prisms are precipitated, which are insoluble in water and represent the basic salt of lime of the paraguaiacolsulfo acid. By sulfuric acid it may be transformed into free paraguaiacolsulfonic acid. The basic salt of lime of the ortho-sulfo acid remains in the solution which is separated from the precipitate of the basic para guaiacolsulfonic lime. From this solution free orthoguaiacolsulfoacid or its alkali salts are prepared in the usual manner, e. g. by adding sulfuric acid or carbonate or bicarbonate of alkali.

Ortho- and para-guaiacolsulfo-acid have very different properties:

1. Orthoguaiacolsulfoacid forms a monopotassium salt which is precipitated from the watery solution by addition of alcohol in the form of needles containing two molecules of water according to the formula $C_6H_3.OCH_3.OH.SO_3K+2aq$. The corresponding para salt contains no water and forms octaedrens.

2. The above named ortho salt is easily soluble in water, the para salt is difficultly soluble in water. A concentrated watery solution of 19° centigrade contains 25 to 30% of the above ortho salt and only 12% of the para salt.

3. Orthoguaiacolsulfoacid and its soluble salts, if dissolved in water, give no precipitate at all on addition of ammonia and calcium chlorid, $CaCl_2$, or barium chlorid, $BaCl_2$ contrary to the corresponding para compounds which give a precipitate forming prisms.

4. The above potassium salt of the ortho acid, dissolved in ten parts of water, on addition of some drops of concentrated nitric acid, gives a dark red coloration and no precipitate. The corresponding para salt gives a yellow precipitate consisting of dinitroguaiacol.

5. Orthoguaiacolsulfoacid and its salts, combined with diazobenzene, give a brick-red azocolor, which if treated with reducing agents, gives a difficultly soluble paraamidoguaiacol sulfo acid, the watery solution of which shows a yellow coloration on addition of ferric chlorid.

The corresponding para compound with diazobenzene yields an orange azocolor giving an easily soluble ortho amidoguaiacol para sulfo acid, the watery solution of which shows a wine red coloration on addition of ferric chlorid.

The orthoguaiacolsulfo acid manufactured according to the described process of separation and being in the form of the free acid or its salts is a new substance differing essentially by its physical, chemical and therapeutic properties from the mixture forming the product manufactured according to the process described in Letters Patent No. 650,218, as also from the mixture obtained on heating on the water-bath guaiacol with the equivalent quantity of sulfuric acid, as proposed by Tiemann and Koppe. The new substance prepared according to the present invention gives no precipitate in an aqueous solution on addition of ammonia and barium or calcium chlorid, whereas the substance obtained according to the United States Patent No. 650,218, gives such a precipitate. In addition of concentrated nitric acid, the new substance obtained according to the present invention does not give an insoluble product. However, the substance prepared according to United States Patent No. 650,218 gives on addition of nitric acid an insoluble product.

What we claim is:—

Process for the separation of ortho-and para-guaiacolsulfoacids and their salts consisting in transforming a mixture of these two acids into their basic salts of the alkaline earths, and filtering off the solution of the ortho salts from the precipitated para salts, substantially as described.

In testimony, that we claim the foregoing as our invention, we have signed our names in presence of two witnesses, this twentieth day of July nineteen hundred five.

BRUNO RICHARD SEIFERT.
HERMANN HÄHLE.

Witnesses:
PAUL E. SCHILLING,
PAUL ARRAS.